United States Patent
Ho

(10) Patent No.: US 12,288,206 B1
(45) Date of Patent: Apr. 29, 2025

(54) SYSTEMS AND METHODS FOR SMART CARD MOBILE DEVICE AUTHENTICATION

(71) Applicant: Wells Fargo Bank, N.A., San Francisco, CA (US)

(72) Inventor: Peter Ho, Walnut Creek, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/214,313

(22) Filed: Mar. 26, 2021

Related U.S. Application Data

(62) Division of application No. 15/073,018, filed on Mar. 17, 2016, now Pat. No. 11,037,139.

(Continued)

(51) Int. Cl.
*G06Q 20/38* (2012.01)
*G06Q 20/22* (2012.01)
(Continued)

(52) U.S. Cl.
CPC ... *G06Q 20/38215* (2013.01); *G06Q 20/3221* (2013.01); *G06Q 20/3263* (2020.05);
(Continued)

(58) Field of Classification Search
None
See application file for complete search history.

(56) References Cited

U.S. PATENT DOCUMENTS

| | | |
|---|---|---|
| 6,324,524 B1 | 11/2001 | Lent et al. |
| 7,013,393 B1 | 3/2006 | Stevens |

(Continued)

FOREIGN PATENT DOCUMENTS

| | | |
|---|---|---|
| CN | 105357190 A | 2/2016 |
| CN | 108075888 A | 5/2018 |

(Continued)

OTHER PUBLICATIONS

P. Urien, "EMV-TLS, a secure payment protocol for NFC enabled mobiles," 2014 International Conference on Collaboration Technologies and Systems (CTS), Minneapolis, MN, USA, 2014, pp. 203-210, doi: 10.1109/CTS.2014.6867565. (Year: 2014).*

(Continued)

*Primary Examiner* — Eduardo Castilho
(74) *Attorney, Agent, or Firm* — Foley & Lardner LLP

(57) ABSTRACT

A method of authenticating a smart card for a mobile pay function of a mobile device using a smart card is disclosed. The method includes: offering, by a mobile pay circuit of the mobile device, a mobile pay function; receiving, by the mobile pay circuit, an affirmative user input to enable the mobile pay function; wirelessly receiving, by a contactless logic of the mobile device, an authentication code from a smart card, wherein the authentication code includes identifying customer information; automatically populating, by the mobile pay circuit, one or more fields of a graphical user interface provided by the mobile pay circuit with the received identifying customer information; authenticating, by the mobile pay circuit, the smart card using the authentication code; and, enabling, by the mobile pay circuit, the mobile pay function with the smart card upon authenticating the smart card.

12 Claims, 4 Drawing Sheets

Related U.S. Application Data

(60) Provisional application No. 62/135,594, filed on Mar. 19, 2015.

(51) Int. Cl.
*G06Q 20/32* (2012.01)
*G06Q 20/34* (2012.01)
*G06Q 20/40* (2012.01)

(52) U.S. Cl.
CPC ........... *G06Q 20/34* (2013.01); *G06Q 20/352* (2013.01); *G06Q 20/40975* (2013.01); *G06Q 20/29* (2013.01); *G06Q 20/3278* (2013.01)

(56) References Cited

U.S. PATENT DOCUMENTS

| | | | |
|---|---|---|---|
| 7,121,456 B2 | 10/2006 | Spaeth et al. | |
| 7,146,159 B1 | 12/2006 | Zhu | |
| 8,205,249 B2 | 6/2012 | Meister et al. | |
| 8,245,292 B2 * | 8/2012 | Buer | G06F 21/34 |
| | | | 713/172 |
| 8,313,022 B2 | 11/2012 | Hammad et al. | |
| 8,332,325 B2 * | 12/2012 | Faith | G06Q 20/40 |
| | | | 705/50 |
| 8,352,323 B2 | 1/2013 | Fisher | |
| 8,355,982 B2 | 1/2013 | Hazel et al. | |
| 8,380,177 B2 | 2/2013 | Laracey | |
| 8,430,325 B2 | 4/2013 | Jain | |
| 8,452,707 B2 | 5/2013 | Sharma | |
| 8,511,547 B2 | 8/2013 | Rans et al. | |
| 8,635,157 B2 | 1/2014 | Smith et al. | |
| 8,639,629 B1 | 1/2014 | Hoffman | |
| 8,763,896 B2 | 7/2014 | Kushevsky et al. | |
| 8,856,045 B1 | 10/2014 | Patel et al. | |
| 8,910,055 B2 | 12/2014 | Berger | |
| 8,918,855 B2 * | 12/2014 | Singh | G06Q 20/3278 |
| | | | 726/9 |
| 8,977,569 B2 | 3/2015 | Rao | |
| 9,135,619 B1 | 9/2015 | Simakov et al. | |
| 9,183,480 B1 | 11/2015 | Quigley et al. | |
| 9,195,984 B1 | 11/2015 | Spector et al. | |
| 9,208,634 B2 | 12/2015 | Lam | |
| 9,218,624 B2 | 12/2015 | Moghadam | |
| 9,256,873 B2 | 2/2016 | Patel et al. | |
| 9,317,848 B2 | 4/2016 | Hammad | |
| 9,367,845 B2 | 6/2016 | Candelore et al. | |
| 9,374,373 B1 | 6/2016 | Chan et al. | |
| 9,542,673 B2 | 1/2017 | Tanner et al. | |
| 9,547,857 B2 | 1/2017 | Moghadam | |
| 9,547,859 B2 | 1/2017 | Patel et al. | |
| 9,576,285 B2 | 2/2017 | Zhou | |
| 9,619,794 B2 | 4/2017 | Zhou et al. | |
| 9,652,770 B1 | 5/2017 | Kurani et al. | |
| 9,741,036 B1 | 8/2017 | Grassadonia et al. | |
| 9,785,943 B2 | 10/2017 | Phillips et al. | |
| 9,805,370 B1 | 10/2017 | Quigley et al. | |
| 9,813,236 B2 * | 11/2017 | Buer | G06F 21/34 |
| 9,830,328 B2 | 11/2017 | Faith et al. | |
| 9,830,589 B2 | 11/2017 | Xing | |
| 9,846,863 B2 | 12/2017 | Grossi et al. | |
| 9,852,426 B2 | 12/2017 | Bacastow | |
| 9,928,493 B2 | 3/2018 | Parker et al. | |
| 9,947,183 B2 | 4/2018 | Priebatsch | |
| 10,049,352 B2 | 8/2018 | Klingen et al. | |
| 10,074,231 B2 | 9/2018 | Miranda et al. | |
| 10,089,624 B2 | 10/2018 | Hammad et al. | |
| 10,102,364 B2 | 10/2018 | George | |
| 10,162,956 B1 | 12/2018 | Truong et al. | |
| 10,198,725 B2 | 2/2019 | Royyuru et al. | |
| 10,198,728 B2 * | 2/2019 | Huxham | G06Q 20/3229 |
| 10,262,320 B2 | 4/2019 | Moghadam | |
| 10,373,138 B2 | 8/2019 | Hammad | |
| 10,395,244 B1 | 8/2019 | Mossler et al. | |
| 10,438,210 B1 | 10/2019 | Perezleon et al. | |
| 10,462,128 B2 | 10/2019 | George | |
| 10,467,622 B1 | 11/2019 | Rule et al. | |
| 10,484,366 B2 | 11/2019 | George | |
| 10,489,781 B1 | 11/2019 | Osborn | |
| 10,510,074 B1 | 12/2019 | Rule et al. | |
| 10,541,995 B1 | 1/2020 | Mossler et al. | |
| 10,586,224 B2 | 3/2020 | Tanner et al. | |
| 10,607,214 B1 | 3/2020 | Rule et al. | |
| 10,607,216 B1 | 3/2020 | Ilincic et al. | |
| 10,636,241 B1 | 4/2020 | Rule et al. | |
| 10,643,420 B1 | 5/2020 | Rule et al. | |
| 10,685,349 B2 | 6/2020 | Brickell et al. | |
| 10,719,833 B2 | 7/2020 | Patel et al. | |
| 10,733,283 B1 | 8/2020 | Osborn et al. | |
| 10,740,444 B2 | 8/2020 | Cho et al. | |
| 10,769,299 B2 | 9/2020 | Rule et al. | |
| 10,803,463 B1 | 10/2020 | Barnum et al. | |
| 10,825,018 B2 | 11/2020 | Moghadam | |
| 10,957,143 B2 | 3/2021 | Rule et al. | |
| 11,037,139 B1 | 6/2021 | Ho | |
| 11,062,302 B1 | 7/2021 | Ho et al. | |
| 11,100,431 B2 * | 8/2021 | Mullen | G06Q 20/322 |
| 11,138,593 B1 | 10/2021 | Ho | |
| 11,138,605 B2 | 10/2021 | Aabye et al. | |
| 11,210,656 B2 | 12/2021 | Rule et al. | |
| 11,301,848 B2 | 4/2022 | Ilincic et al. | |
| 11,334,872 B2 | 5/2022 | Phillips et al. | |
| 11,348,150 B2 | 5/2022 | Singhal et al. | |
| 11,372,954 B2 | 6/2022 | Wiesman et al. | |
| 11,373,169 B2 | 6/2022 | Rule et al. | |
| 11,373,186 B2 | 6/2022 | Sharma et al. | |
| 11,436,887 B2 | 9/2022 | Rule et al. | |
| 11,455,626 B2 | 9/2022 | Rule et al. | |
| 11,501,581 B2 * | 11/2022 | Hammad | G06Q 20/40 |
| 11,521,213 B2 | 12/2022 | Rule et al. | |
| 11,562,358 B2 | 1/2023 | Rule et al. | |
| 11,615,395 B2 | 3/2023 | Mchugh et al. | |
| 11,625,708 B2 | 4/2023 | Kang | |
| 11,645,646 B2 | 5/2023 | Rule et al. | |
| 11,734,985 B2 | 8/2023 | Rule et al. | |
| 11,875,338 B2 | 1/2024 | Rule et al. | |
| 11,880,823 B2 | 1/2024 | Rule et al. | |
| 11,922,417 B2 | 3/2024 | Rule et al. | |
| 11,961,089 B2 | 4/2024 | Rule et al. | |
| 11,989,731 B2 | 5/2024 | Sharma et al. | |
| 12,056,692 B2 | 8/2024 | Ilincic et al. | |
| 12,061,682 B2 | 8/2024 | Bowers et al. | |
| 12,067,568 B2 | 8/2024 | Osborn et al. | |
| 12,105,789 B2 | 10/2024 | Sharma et al. | |
| 12,112,310 B2 | 10/2024 | Mchugh et al. | |
| 12,112,325 B2 | 10/2024 | Aabye et al. | |
| 2002/0002466 A1 | 1/2002 | Kambayashi et al. | |
| 2002/0023051 A1 | 2/2002 | Kunzle et al. | |
| 2002/0116333 A1 | 8/2002 | Mcdonnell et al. | |
| 2002/0117541 A1 | 8/2002 | Biggar et al. | |
| 2003/0051173 A1 | 3/2003 | Krueger | |
| 2003/0061154 A1 | 3/2003 | Chacko | |
| 2004/0006497 A1 | 1/2004 | Nestor et al. | |
| 2005/0234860 A1 | 10/2005 | Roever et al. | |
| 2005/0246193 A1 | 11/2005 | Roever et al. | |
| 2005/0269402 A1 | 12/2005 | Spitzer et al. | |
| 2006/0035707 A1 | 2/2006 | Nguyen et al. | |
| 2007/0187491 A1 | 8/2007 | Godwin et al. | |
| 2008/0010215 A1 | 1/2008 | Rackley, III et al. | |
| 2008/0035725 A1 | 2/2008 | Jambunathan et al. | |
| 2008/0123828 A1 | 5/2008 | Mayer | |
| 2008/0178258 A1 | 7/2008 | Loomis et al. | |
| 2008/0212771 A1 | 9/2008 | Hauser | |
| 2008/0242274 A1 | 10/2008 | Swanburg et al. | |
| 2009/0055648 A1 | 2/2009 | Kim et al. | |
| 2009/0143104 A1 | 6/2009 | Loh et al. | |
| 2009/0156238 A1 | 6/2009 | Smith | |
| 2009/0200371 A1 | 8/2009 | Kean et al. | |
| 2010/0049654 A1 | 2/2010 | Pilo | |
| 2010/0125509 A1 | 5/2010 | Kranzley et al. | |
| 2010/0198728 A1 | 8/2010 | Aabye et al. | |
| 2010/0276484 A1 | 11/2010 | Banerjee et al. | |
| 2010/0293382 A1 | 11/2010 | Hammad | |
| 2010/0306072 A1 | 12/2010 | Ford et al. | |

(56) References Cited

U.S. PATENT DOCUMENTS

| | | |
|---|---|---|
| 2010/0312703 A1 | 12/2010 | Kulpati et al. |
| 2011/0112968 A1 | 5/2011 | Florek et al. |
| 2011/0131108 A1 | 6/2011 | Doxey |
| 2011/0270755 A1 | 11/2011 | Pinski |
| 2011/0282946 A1 | 11/2011 | Keohane et al. |
| 2011/0302646 A1* | 12/2011 | Ronda .................. H04L 9/3268 726/9 |
| 2011/0314095 A1 | 12/2011 | Gupta et al. |
| 2012/0039469 A1 | 2/2012 | Mueller |
| 2012/0078735 A1 | 3/2012 | Bauer et al. |
| 2012/0095852 A1 | 4/2012 | Bauer et al. |
| 2012/0123937 A1 | 5/2012 | Spodak |
| 2012/0136786 A1 | 5/2012 | Romagnoli et al. |
| 2012/0149331 A1 | 6/2012 | Wu et al. |
| 2012/0209749 A1 | 8/2012 | Hammad et al. |
| 2012/0290449 A1 | 11/2012 | Mullen et al. |
| 2012/0290472 A1* | 11/2012 | Mullen .............. G06Q 20/3278 705/39 |
| 2012/0323717 A1 | 12/2012 | Kirsch |
| 2013/0013480 A1 | 1/2013 | Venter |
| 2013/0054412 A1 | 2/2013 | Brendell et al. |
| 2013/0054417 A1 | 2/2013 | O'Donoghue et al. |
| 2013/0054474 A1 | 2/2013 | Yeager |
| 2013/0092741 A1 | 4/2013 | Loh et al. |
| 2013/0117138 A1 | 5/2013 | Hazel et al. |
| 2013/0124346 A1 | 5/2013 | Baldwin et al. |
| 2013/0152185 A1* | 6/2013 | Singh ..................... G06Q 20/36 726/9 |
| 2013/0159178 A1 | 6/2013 | Colon et al. |
| 2013/0166441 A1 | 6/2013 | Kobylkin et al. |
| 2013/0171929 A1 | 7/2013 | Adams et al. |
| 2013/0198066 A1 | 8/2013 | Wall et al. |
| 2013/0200146 A1* | 8/2013 | Moghadam ........ G06Q 20/3567 235/379 |
| 2013/0217361 A1 | 8/2013 | Mohammed et al. |
| 2013/0226791 A1 | 8/2013 | Springer et al. |
| 2013/0238455 A1 | 9/2013 | Laracey |
| 2013/0246203 A1 | 9/2013 | Laracey |
| 2013/0262302 A1 | 10/2013 | Lettow et al. |
| 2013/0262317 A1* | 10/2013 | Collinge ............ G06Q 20/3265 705/72 |
| 2013/0317928 A1 | 11/2013 | Laracey |
| 2013/0318575 A1 | 11/2013 | Hart et al. |
| 2014/0001253 A1 | 1/2014 | Smith |
| 2014/0019352 A1 | 1/2014 | Shrivastava |
| 2014/0052637 A1 | 2/2014 | Jooste et al. |
| 2014/0061299 A1 | 3/2014 | Scipioni |
| 2014/0074581 A1 | 3/2014 | Johnson et al. |
| 2014/0074637 A1 | 3/2014 | Hammad |
| 2014/0074655 A1 | 3/2014 | Lim et al. |
| 2014/0096202 A1 | 4/2014 | Matsuda |
| 2014/0101734 A1 | 4/2014 | Ronda et al. |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0122331 A1 | 5/2014 | Vaish et al. |
| 2014/0129435 A1 | 5/2014 | Pardo et al. |
| 2014/0161258 A1 | 6/2014 | Yang et al. |
| 2014/0172577 A1 | 6/2014 | Rephlo |
| 2014/0181520 A1 | 6/2014 | Wendling et al. |
| 2014/0207680 A1 | 7/2014 | Rephlo |
| 2014/0229377 A1 | 8/2014 | Vakklaganti |
| 2014/0279522 A1 | 9/2014 | Musser et al. |
| 2014/0337089 A1 | 11/2014 | Tavares |
| 2014/0337236 A1* | 11/2014 | Wong ................. G06Q 20/3227 705/41 |
| 2014/0339315 A1 | 11/2014 | Ko |
| 2014/0344153 A1 | 11/2014 | Raj et al. |
| 2014/0370851 A1 | 12/2014 | Wang et al. |
| 2014/0372308 A1 | 12/2014 | Sheets |
| 2015/0004934 A1* | 1/2015 | Qian .................... G06Q 20/409 455/411 |
| 2015/0032569 A1 | 1/2015 | Stromberg |
| 2015/0032625 A1 | 1/2015 | Dill et al. |
| 2015/0046276 A1 | 2/2015 | Artman et al. |
| 2015/0046339 A1 | 2/2015 | Wong et al. |
| 2015/0046340 A1 | 2/2015 | Dimmick |
| 2015/0073995 A1 | 3/2015 | Hayhow et al. |
| 2015/0081461 A1 | 3/2015 | Adrangi et al. |
| 2015/0081538 A1 | 3/2015 | Renard et al. |
| 2015/0098463 A1 | 4/2015 | Davis et al. |
| 2015/0149336 A1 | 5/2015 | Haggerty et al. |
| 2015/0156601 A1 | 6/2015 | Donnellan et al. |
| 2015/0161591 A1 | 6/2015 | Yang |
| 2015/0170137 A1 | 6/2015 | Balbus |
| 2015/0186871 A1 | 7/2015 | Laracey |
| 2015/0195133 A1 | 7/2015 | Sheets et al. |
| 2015/0248664 A1 | 9/2015 | Makhdumi et al. |
| 2015/0269565 A1 | 9/2015 | Inotay et al. |
| 2015/0356560 A1 | 12/2015 | Shastry et al. |
| 2015/0371234 A1 | 12/2015 | Huang et al. |
| 2016/0036790 A1 | 2/2016 | Shastry et al. |
| 2016/0078434 A1 | 3/2016 | Huxham et al. |
| 2016/0086166 A1 | 3/2016 | Pomeroy et al. |
| 2016/0086184 A1 | 3/2016 | Carpenter et al. |
| 2016/0125396 A1 | 5/2016 | Brickell et al. |
| 2016/0142174 A1 | 5/2016 | Fine et al. |
| 2016/0147526 A1 | 5/2016 | Camp et al. |
| 2016/0155111 A1 | 6/2016 | Arnald et al. |
| 2016/0162883 A1 | 6/2016 | Liscia et al. |
| 2016/0173483 A1 | 6/2016 | Wong et al. |
| 2016/0180330 A1 | 6/2016 | Feldman |
| 2016/0232524 A1 | 8/2016 | Barrale et al. |
| 2016/0241402 A1 | 8/2016 | Gordon et al. |
| 2016/0247233 A1 | 8/2016 | Page |
| 2016/0253651 A1 | 9/2016 | Park et al. |
| 2016/0292673 A1 | 10/2016 | Chandrasekaran |
| 2016/0307184 A1 | 10/2016 | Peyton et al. |
| 2016/0307186 A1* | 10/2016 | Noë .................. G06Q 20/3278 |
| 2016/0364938 A1 | 12/2016 | Miranda et al. |
| 2017/0004506 A1 | 1/2017 | Steinman et al. |
| 2017/0046679 A1 | 2/2017 | Gotlieb et al. |
| 2017/0109745 A1 | 4/2017 | Al-Bedaiwi et al. |
| 2017/0116615 A1 | 4/2017 | Burgess et al. |
| 2017/0249132 A1 | 8/2017 | Andrews et al. |
| 2017/0262819 A1 | 9/2017 | Malhotra et al. |
| 2017/0063827 A1 | 10/2017 | Baba |
| 2017/0302637 A1 | 10/2017 | Baba |
| 2017/0316493 A1 | 11/2017 | Numata |
| 2018/0012226 A1 | 1/2018 | Phillips et al. |
| 2018/0025349 A1 | 1/2018 | Marsh |
| 2018/0047022 A1 | 2/2018 | Schipperheijn |
| 2018/0053157 A1 | 2/2018 | Roffey |
| 2018/0089677 A1 | 3/2018 | Ali et al. |
| 2018/0101672 A1 | 4/2018 | George |
| 2018/0160255 A1 | 6/2018 | Park |
| 2018/0181978 A1 | 6/2018 | Weinberger et al. |
| 2018/0197171 A1 | 7/2018 | Steinman et al. |
| 2018/0233001 A1 | 8/2018 | Priebatsch |
| 2018/0255460 A1 | 9/2018 | Hammad et al. |
| 2018/0270066 A1 | 9/2018 | Doyon et al. |
| 2018/0285868 A1 | 10/2018 | O'Hara et al. |
| 2018/0336562 A1 | 11/2018 | Umanski et al. |
| 2019/0001732 A1 | 1/2019 | Ongsitco |
| 2019/0005494 A1 | 1/2019 | Hammad et al. |
| 2019/0066113 A1 | 2/2019 | Gupta et al. |
| 2019/0087823 A1 | 3/2019 | Patel et al. |
| 2019/0089705 A1 | 3/2019 | Chud et al. |
| 2019/0109842 A1 | 4/2019 | Kumar et al. |
| 2019/0122222 A1 | 4/2019 | Uechi |
| 2019/0190717 A1 | 6/2019 | Beric et al. |
| 2019/0197553 A1 | 6/2019 | Conway |
| 2019/0238504 A1 | 8/2019 | Gupta et al. |
| 2019/0332912 A1 | 10/2019 | Walker |
| 2020/0019725 A1 | 1/2020 | Rule et al. |
| 2020/0154278 A1 | 5/2020 | Douglas et al. |
| 2020/0184462 A1 | 6/2020 | Rule et al. |
| 2020/0202322 A1 | 6/2020 | Tanner et al. |
| 2020/0238952 A1 | 7/2020 | Lindsay et al. |
| 2020/0242588 A1 | 7/2020 | Rule et al. |
| 2020/0242616 A1 | 7/2020 | Waughtal |
| 2020/0302436 A1 | 9/2020 | Ilincic et al. |
| 2020/0304311 A1 | 9/2020 | Rule et al. |

(56) References Cited

U.S. PATENT DOCUMENTS

| | | | |
|---|---|---|---|
| 2020/0314644 A1 | 10/2020 | Dean et al. | |
| 2021/0004786 A1 | 1/2021 | Mossler et al. | |
| 2021/0272097 A1 | 9/2021 | Wen et al. | |
| 2021/0319427 A1 | 10/2021 | Rule et al. | |
| 2021/0383381 A1 | 12/2021 | Aabye et al. | |
| 2022/0036340 A1 | 2/2022 | Hollander et al. | |
| 2022/0198448 A1 | 6/2022 | Ilincic et al. | |
| 2022/0300981 A1 | 9/2022 | Sharma et al. | |
| 2022/0335432 A1 | 10/2022 | Rule et al. | |
| 2022/0405741 A1 | 12/2022 | Rule et al. | |
| 2022/0407724 A1 | 12/2022 | Osborn et al. | |
| 2023/0020843 A1 | 1/2023 | Anthony et al. | |
| 2023/0021963 A1 | 1/2023 | Singhal et al. | |
| 2023/0050991 A1 | 2/2023 | Rule et al. | |
| 2023/0052901 A1 | 2/2023 | Boryk et al. | |
| 2023/0059546 A1 | 2/2023 | Huang et al. | |
| 2023/0169503 A1 | 6/2023 | Jeffrey et al. | |
| 2023/0237466 A1 | 7/2023 | Rule et al. | |
| 2023/0281594 A1 | 9/2023 | Mchugh et al. | |
| 2023/0343165 A1 | 10/2023 | Rule et al. | |
| 2023/0410087 A1 | 12/2023 | Hollander et al. | |
| 2023/0418923 A1 | 12/2023 | Ogbennah et al. | |
| 2024/0046266 A1 | 2/2024 | Rule et al. | |
| 2024/0046272 A1 | 2/2024 | Benkreira et al. | |
| 2024/0054498 A1 | 2/2024 | Sinha et al. | |
| 2024/0062206 A1 | 2/2024 | Osborn et al. | |

FOREIGN PATENT DOCUMENTS

| | | | | |
|---|---|---|---|---|
| EP | 1 773 018 A1 | 4/2007 | | |
| EP | 3 761 248 | 6/2021 | | |
| KR | 20160064061 A | 6/2016 | | |
| KR | 2018015920 A | 2/2018 | | |
| KR | 20180015920 A | * | 2/2018 | ............ G06Q 20/40 |
| WO | WO-01/46775 A2 | 6/2001 | | |
| WO | WO-2005/098737 A2 | 10/2005 | | |
| WO | WO-2005/119607 A2 | 12/2005 | | |
| WO | WO-2005/119608 A1 | 12/2005 | | |
| WO | WO-2006/023839 A2 | 3/2006 | | |
| WO | WO-20077038896 A2 | 4/2007 | | |
| WO | WO-2007/076476 A2 | 7/2007 | | |
| WO | WO-2010/033944 A2 | 3/2010 | | |
| WO | WO-2010/127244 A2 | 11/2010 | | |
| WO | WO-2010/127244 A3 | 11/2010 | | |
| WO | WO-2012/042262 A1 | 4/2012 | | |
| WO | WO-2013/028910 A2 | 8/2012 | | |
| WO | WO-2013/010096 A1 | 1/2013 | | |
| WO | WO-2014/170668 A1 | 10/2014 | | |
| WO | WO-2015/104387 A1 | 7/2015 | | |
| WO | WO-2016/001867 A2 | 1/2016 | | |
| WO | WO-2016/028779 A1 | 2/2016 | | |
| WO | WO-2016/049745 A1 | 4/2016 | | |
| WO | WO-2017/096399 A1 | 6/2017 | | |
| WO | WO-2017/174200 A3 | 10/2017 | | |
| WO | WO-2018/217106 A1 | 11/2018 | | |
| WO | WO-2019/238688 A1 | 12/2019 | | |
| WO | WO-2020/122898 A1 | 6/2020 | | |

OTHER PUBLICATIONS

R. Schamberger, G. Madlmayr and T. Grechenig, "Components for an interoperable NFC mobile payment ecosystem, " 2013 5th International Workshop on Near Field Communication (NFC), Zurich, Switzerland, 2013, pp. 1-5, doi: 10.1109/NFC.2013. 6482440. (Year: 2013).*

EMV, "Integrated Circuit Card Specifications for Payment Systems,"— v. 4.3, Book 3, 2011. (Year: 2011).*

Espacenet Machine translation of Foreign Application KR20180015920 (Year: 2018).*

Borchert, B.; Gunther, M.;Indirect NFC-Login on a Non-NFC Device using an NFC-Smartphone; international Journal of Intelligent Computing Research; vol. 4, Iss. 4, Dec. 2013; 7 Pages.

FIDO Alliance. Open Authentication Standards More Secure than Passwords. fidoalliance.org. Accessed Jul. 23, 2019.

Kadambi et al., "Near-Field Communication-Based Secure Mobile Payment Service", Proceedings of the 11th International Conference on Electronic Commerce, ACM, 2009.

Liao, Shannon. "Google will not let you use your Android phone as a physical security key." www.theverge.com/2019/4/10/18295348/ google-android-phone-fido-webauthn-phishing-two-factor-authentication. Apr. 10, 2019. Accessed Jul. 23, 2019.

Liao, Shannon. "Google will now let you use your Android phone as a physical security key." www.theverge.com/2019/4/10/18295348/ google-android-phone-fido-webauthn-phishing-two-factor-authentication., Apr. 10, 2019. Accessed Jul. 23, 2019.

Poroye, Adeola Oluwaseyi. "Secure contactless mobile financial services with Near Field Communication", Diss. University of the Western Cape, 2011. Located via Google Scholar, http://etd.uwc. ac.za/bitstream/handle/11394/1752/Poroye_MSC_2011.pdf?sequence= 1.

Robert Triggs, "All you need to know about NFC Tags", Android Authority, Aug. 29, 2018, p. 2 (Year: 2018).

Russell, "3 Reasons Why I ap and Pay (NFC) Is Awesome", Jun. 9, 2018, Helcim Articles (Year: 2018).

Triggs, R., "All You Need to Know About NFC Tags," Android Authority, Aug. 29, 2018, 6 pages.

Wong, Wen Teng. "Security of NFC payment on mobile payment application", Diss. UTAR, 2018. Located via Google Scholar, http://eprints.utar.edu.my/3050/1/fyp_CS_2018_WWT_-_1403709. pdf.

Yang, "Security Enhanced EMV-Based Mobile Payment Protocol", Hindawi Publishing Corporation, The Scientific World Journal, vol. 214, Article ID 864571, 2014, 19 pages.

Java Tutorials, "What Is a Network Interface?," http://docs.oracle. com, all pages. (Year: 2012).

Poroye, Adeola Oluwaseyi. "Secure contactless mobile financial services with Near Field Communication", Diss. University of the Western Cape, 2011. Located via Google Scholar, http:l/etd.uwc. ac.za/bitstream/handle/11394/1752/Poroye MSC 2011.pdf?sequence= 1.

Triggs, R., "All you need to know about NFC Tags", 2018, Android Authority (2 Pages).

* cited by examiner

SYSTEMS AND METHODS FOR SMART CARD MOBILE DEVICE AUTHENTICATION

CROSS-REFERENCE TO RELATED APPLICATIONS

This application is a divisional of U.S. patent application Ser. No. 15/073,018, entitled "SYSTEMS AND METHODS FOR SMART CARD MOBILE DEVICE AUTHENTICATION," filed on Mar. 17, 2016, which claims priority to U.S. Provisional Application No. 62/135,594, entitled "SYSTEMS AND METHODS FOR SMART CARD MOBILE DEVICE AUTHENTICATION," filed on Mar. 19, 2015, both of which are incorporated herein by reference in their entireties.

BACKGROUND

Financial institutions such as banks typically offer their customers a variety of payment alternatives to meet their needs. One such alternative is for the financial institution to offer the customer a payment card that provides the customer with quick and convenient access to a charge account from multiple locations where the card is accepted. Charge accounts can include, for example, lines of credit, checking accounts, temporary prepaid accounts, and so on. The card issuer typically provides the customer with a plastic card or other device having an account number associated therewith, and establishes a corresponding charge account for the customer. The card or other device may be used by the customer to purchase goods and services by charging the charge account. The card issuer authorizes payment for the goods or services and then enters a debit to the charge account.

Many mobile devices such as cell phones include software applications and hardware sufficient to provide a mobile pay function. Mobile pay functions allow users to purchase goods and services from physical merchants with their mobile devices, using funds from their charge accounts in the absence of a physical payment card. A given user can enter payment card information into their mobile device, which may then be subsequently used to transmit the payment card information to a merchant's point of sale to facilitate a transaction without having to provide the actual payment card to the merchant.

Payment card information sufficient to enable the mobile pay service can often be found on the face of the payment card itself. As such, an unauthorized user with visual or temporary access to a payment card may be able to activate a mobile pay service associated with that payment card on their own mobile device (e.g., by taking a digital image of the payment card or writing down the payment card information, and activating mobile pay later on) and proceed with unauthorized purchases.

SUMMARY

One example embodiment relates to a method of authenticating a mobile pay feature on a mobile device. The method includes offering, by a mobile pay circuit, a mobile pay functionality. The method further includes receiving, by the mobile pay circuit, an affirmative user input to enable the mobile pay functionality. The method includes receiving, by a contactless logic, an encrypted authentication code from a smart card. The method further includes authenticating, by the mobile pay circuit, the smart card for use in the mobile device using the authentication code. The method includes enabling, by the mobile pay circuit, the mobile pay feature upon authenticating the smart card.

Another example embodiment relates to a method of authenticating a mobile pay feature on a mobile device. The method includes offering, by a mobile pay circuit of the mobile device, a mobile pay functionality. The method further includes receiving, by the mobile pay circuit, user information and account information, wherein the account information includes an account number of a payment card. The method includes receiving, by a contactless logic of the mobile device, an authentication code from a contactless chip of the payment card. The method further includes transmitting, by the mobile pay circuit, the user information, the account information, and the authentication code to a card issuer computing system associated with a card issuer of the payment card. The method includes receiving, by the mobile pay circuit, an authentication decision from the card issuer computing system.

A further example embodiment relates to a method of authenticating a mobile device for a mobile pay function. The method includes receiving, by a card issuer computing system associated with a payment card issuer, an authentication request for a mobile pay function from a mobile device. The authentication request includes account information associated with a payment card issued by the payment card issuer and an authentication code. The method further includes verifying, by the card issuer computing system, the account information and the authentication code was generated by the payment card. The method includes transmitting, by the card issuer computing system, authentication decision to the mobile device, wherein the authentication decision corresponds to an approval message.

These and other features, together with the organization and manner of operation thereof, will become apparent from the following detailed description when taken in conjunction with the accompanying drawings, wherein like elements have like numerals throughout the several drawings described below.

DETAILED DESCRIPTION

According to various embodiments, systems and methods for authenticating a mobile pay function on a mobile device is provided. In some arrangements, the mobile pay function stores a user's personal and payment card information on an associated mobile device, and allows the mobile device to wirelessly transmit payment information to a merchant's point of sale to facilitate a purchase of goods or services, or to perform other financial operations relating to the underlying charge account. Consistent among the embodiments discussed below, a "smart" payment card is physically present during the initial mobile pay authentication process.

Figure 1:
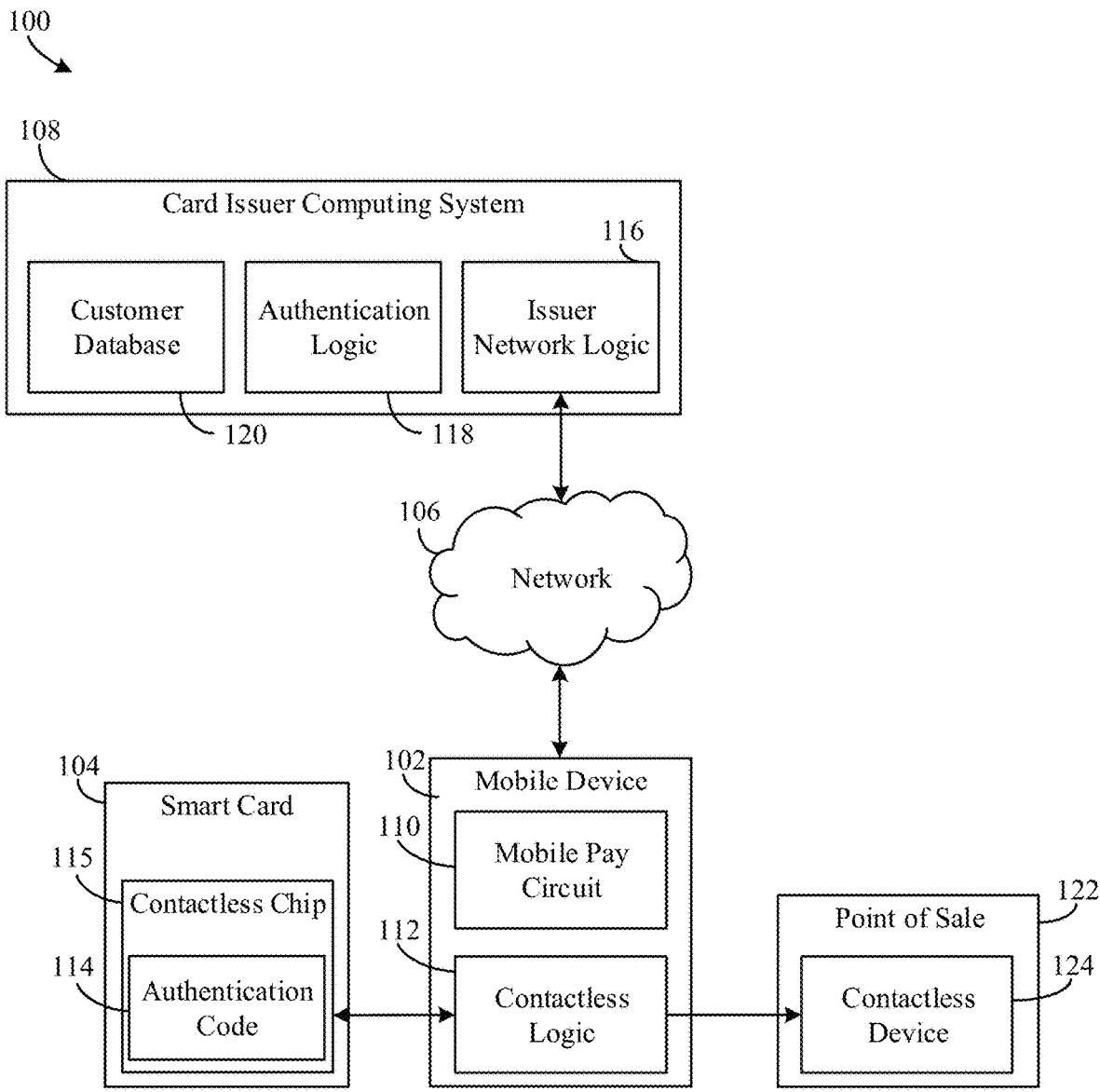
FIG. 1 is a block diagram illustrating a mobile pay authentication and transaction system, according to an example embodiment.

Referring now to FIG. 1, a block diagram of an authentication and transaction system 100 is shown according to an example embodiment. The authentication and transaction system 100 includes a mobile device 102, a smart card 104, a network 106, and a card issuer computing system 108. The mobile device 102 may include, for example, mobile phones, smartphones, tablets, wearable computing devices (e.g., eyewear, smart watches, etc.), laptop computers, and so on. A common feature of the mobile device 102 is the ability to access the network 106 in order to send and receive data to and from the card issuer computing system 108, including authentication requests. The network 106 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

The mobile device 102 includes a mobile pay circuit 110. The mobile pay circuit 110 may include program logic executable by a processor of the mobile device 102 to implement at least some of the functions described herein. In order to make the mobile pay circuit 110, a third party provider (e.g., a software developer or publisher) can make a software application available to be placed on the mobile device 102. For example, a software developer may make the software application available to be downloaded (e.g., via the developer's website, via an app store, or in another manner). In some arrangements, the third party provider is the card issuer or financial institution associated with the smart card 104. Responsive to a user selection of an appropriate link, the software application can be transmitted to the mobile device 102 and cause itself to be installed on the mobile device 102. Installation of the software application creates the mobile pay circuit 110 on the mobile device. Specifically, after installation, the thus-modified mobile device 102 includes the mobile pay circuit 110 (embodied as a processor and instructions stored in non-transitory memory that are executed by the processor).

The mobile device 102 further includes contactless logic 112. The contactless logic 112 includes hardware and associated software sufficient to enable the mobile device 102 to wirelessly and securely exchange data over short distances (e.g., within a range of a few inches or less). In some arrangements, the contactless logic 112 is configured to use radio frequency identification (RFID) to exchange digital information. In some such arrangements, the contactless logic 112 enables the mobile device 102 to exchange data over a radio frequency range required for near field communication (NFC). In some arrangements, the mobile pay circuit 110 includes instructions to selectively employ the contactless logic 112 to send or receive information.

The smart card 104 is a payment card associated with a charge account (e.g., a line of credit, a checking account, a prepaid account, and the like) for a given customer, and is capable of wirelessly exchanging information. The smart card 104 can include visible information on the face of the card and digital information stored within various structures in the smart card 104 itself. For example, the smart card 104 can include a customer's name and a payment card account number, which can be printed or embossed on the physical card. Further, the smart card 104 can include more detailed identifying customer information (e.g., name, address, phone number, and so on) and account information (e.g., account numbers, information as to the card issuer, and so on) in a magstrip, or an onboard contactless chip 115. For example, the smart card 104 can be a credit card, a debit card, or the like.

The contactless chip 115 is a defining feature of the "smart" aspect of the smart card 104. The contactless chip 115 is a small circuitry system configured to wirelessly exchange data. In some arrangements, the contactless chip 115 can exchange data via RFID or NFC communication. The contactless chip 115 can be configured to be able to selectively transmit various types of information, including payment card information (e.g., account numbers, issuing entities, and so on), identifying customer information (e.g., user name, billing address, phone number, and so on), cryptograms, an authentication code, and the like to other devices (e.g., to the mobile device 102, to the point of sale system 122, etc.). Such arrangements can be found in existing smart card functions provided by, for example, Visa payWave™, Mastercard PayPass™, and American Express ExpressPay™.

The contactless chip 115 can also be configured to transmit an authentication code 114. The authentication code 114 can include payment card information and identifying customer information, along with a cryptogram, which in some arrangements, is a sequence of characters that have been encoded through one or more algorithms to conceal data from unauthorized parties.

The card issuer computing system 108 is a computing system at a financial entity that issued the smart card 104 to a customer. In the context of the present disclosure, the financial entity can include financial institutions such as commercial or private banks, credit unions, investment brokerages, and so on, but can also include any commercial entity capable of maintaining charge accounts, including merchants, service providers, and the like. The card issuer computing system 108 is configured to manage charge accounts and to authenticate transactions involving debits from charge accounts associated with existing customers.

The card issuer computing system 108 includes an issuer network logic 116, an authentication logic 118, and a customer database 120. The issuer network logic 116 is configured to enable the card issuer computing system 108 to exchange information over the network 106. The customer database 120 can be configured to contain information for a plurality of customers with issued smart cards, including for example, personal customer information (e.g., names, addresses, phone numbers, and so on) and customers' financial information (e.g., associated financial institutions, account numbers, available credit, credit history, and so on). The information contained in the customer database 120 is sufficient for the card issuer computing system 108 to perform a variety of checks surrounding a given smart card transaction, including for example, confirming identifying customer information, determining a customer's transaction history, determining a customer's available credit, and so on.

The authentication logic 118 is configured to perform operations relating to transactions involving the smart card 104. For example, the authentication logic 118 can be configured to receive an authentication request from the mobile pay circuit 110 over the network 106 via the issuer network logic 116. In some such arrangements, the authentication request includes the authentication code 114 with a cryptogram. The authentication logic 118 may then decrypt a received cryptogram included in the authentication code 114, verify the resulting data and the rest of the information in the authentication code 114 using information in the customer database 120, approve or deny the authentication request, and push the approval or denial back to the mobile pay circuit 110.

In operation, a customer seeking to activate a mobile pay function on the mobile device 102 can install a mobile pay application giving rise to the mobile pay circuit 110. In some arrangements, the mobile pay circuit 110 is configured to cause the mobile device 102 to present a graphical user interface on an associated display, prompting the customer to set up a mobile pay account. As part of the setup process, in some arrangements, the graphical user interface can prompt the customer to enter identifying information (e.g., name, address, phone number, etc.), which may be accomplished through an input device associated with the mobile device 102 (e.g., a touchscreen, a physical keyboard, voice recognition, or the like). Further, the graphical user interface may be configured to prompt the customer to enter payment card information for the smart card 104. In some arrangements, the graphical user interface may require the customer to manually enter the payment card information (e.g., a sixteen-digit payment card number, expiration date, CCV number, etc.) in the same manner as the identifying information (i.e., manually via an input device). In other arrangements, the graphical user interface prompts the user to take a picture of the smart card and the mobile pay application performs optical character recognition to identify the payment card information.

As part of the setup process, the mobile pay circuit 110 communicates with the contactless chip 115 on the smart card 104 to receive the authentication code 114 via the contactless logic 112. As discussed above, the authentication code 114 can include a cryptogram. The authentication code 114 can also include identifying customer information (e.g., name, billing address, phone number, and so on) and payment card information (e.g., charge account number, issuing entity, and so on) to provide sufficient information for the mobile pay function on the mobile device 102 to operate. In some such arrangements, the non-cryptogram information in the authentication code 114 (e.g., the payment card information, the customer information, etc.) does not need to be manually entered by a user, and may automatically be populated in the appropriate fields of the graphical user interface upon a contactless transmission of the authentication code 114. The contactless chip 115 transmits the authentication code 114 to the mobile pay circuit 110 of the mobile device 102 by, for example, being brought within a threshold proximity to the mobile device 102 sufficient to establish a wireless data handshake where data exchange between the contactless logic 112 of the mobile device 102 and the contactless chip 114 on the smart card 104 occurs (e.g., via RFID, NFC, or the like). Upon receiving a wireless signal transmission of a data payload including the authentication code 114 from the contactless chip 115, the contactless logic 112 can route the authentication code 114 to the mobile pay circuit 110.

In one arrangement, the mobile pay circuit 110 receives an authentication code 114 that includes a cryptogram intended to be used for authenticating the smart card 104. In such an arrangement, the mobile pay circuit 110 may transmit the cryptogram to the card issuer computing system 108 in an authentication request over the network 106. In some such arrangements, the authentication request is a transaction authorization request entailing a charge of little to no funds (e.g., a transaction of $0.01, or a transaction of $0.00). The authentication logic 118 at the card issuer computing system 108 can receive what appears to be a normal transaction authorization request (i.e., not meaningfully distinguishable from an actual purchase transaction at a point of sale system) and proceed to process the authentication request as a transaction authorization request. As such, the authentication logic 118 may not have to be altered or tailored to address authentication request from a mobile device 102, but can simply apply existing transaction authorization procedures instead. The authentication logic 118 can proceed to decrypt the cryptogram from the authentication code 114, and confirm that the resulting data corresponds to the smart card 104 and the user (i.e., the user attempting to enable a mobile pay function on the mobile device 102) by, for example, retrieving data from the customer database 120. In some such arrangements, the authentication logic 118 can recognize that a requested transaction of $0.00 (or $0.01) indicates an attempt to enable a mobile pay feature on a mobile device and apply a specific set of authentication rules. If the authentication request passes all of the authentication rules at the card issuer computing system 108, the authentication logic 118 can transmit an authentication approval back to the mobile device 102 over the network 106 via the issuer network logic 116. In some arrangements, the authentication approval includes payment card information sufficient to complete future purchase transactions via the mobile device 102.

Further, in some arrangements, the mobile pay circuit 110 can take additional authentication steps at the mobile device 102 to supplement the authentication process occurring at the card issuer computing system 108. For example, the mobile pay circuit 110 can, for example, require the customer to enter a PIN number, biometric data, or answers to identification questions into a graphical user interface in the mobile device 102. In addition, the mobile pay circuit 110 can compare identifying customer information contained in the authentication code 114 received from the contactless chip 115 to identifying customer information stored in the mobile device 102 (e.g., where the mobile device is registered under a given individual, accounts configured in various mobile applications in the mobile device 102, and the like).

Upon receiving an authentication approval from the card issuer computing system 108, the mobile pay circuit 110 can confirm that the user and the mobile device 102 is authorized to access and use the charge account(s) associated with the smart card 104. In which case, the mobile pay circuit 110 can enable the mobile pay function on the mobile device to complete purchase transactions. In some arrangements, financial transactions can subsequently be completed via the contactless logic 112 at a point of sale 122. The point of sale 122 is a computing system at a merchant of goods or services configured to facilitate customer transactions. The point of sale 122 includes a contactless device 126. The contactless device 126 includes hardware and software sufficient to enable the point of sale 122 to wirelessly exchange information with the contactless logic 112 of the mobile device 102. In one arrangement, the point of sale 122 also includes a database containing product and/or service information provided by a given merchant, such as quantity of units available, price, and so on. Further, the point of sale 122 can also include a display, which can take the form of any of several types of devices, including LCD, LED, CRT, plasma, or other such digital displays, projection-based monitors, touchscreens, and so on. In some arrangements, the display and/or the database is included in a merchant's smartphone.

In operation, after enabling a mobile pay function on the mobile device 102, a customer can identify a merchant's good at the point of sale 122 and attempt to purchase it. The point of sale 122 may be configured to retrieve information as to the identified good, including price, from an associated database and present the information on a display, and prompt the merchant to request payment. The customer can bring the mobile device 102 within a threshold proximity to the contactless device 124 to allow the mobile pay circuit 110 to transmit payment information associated with the smart card 104 to the point of sale 122 via the contactless logic 112 to complete a transaction for the sale of the identified good.

In some arrangements, after receiving an authentication approval from the card issuer computing system 108, the mobile pay circuit 110 can allow a user to perform additional operations through the mobile device 102 beyond purchase transactions. For example, because the mobile pay circuit 110 has authenticated the user and the mobile device 102 to use the smart card 104, the mobile pay circuit 110 can also allow the mobile device 102 to access information relating to the charge account associated with the smart card 104. In some such arrangements, an authenticated user may not need to enter a username and password to access a charge account webpage on a card issuer website or software application. As such, an authenticated user may be able to view information such as account balances, available credit, payment due dates, and so on through the mobile device 102 without having to manually log in. Further, in some arrangements where the card issuer computing system 108 is a financial institution where the user also has one or more non-credit based accounts (e.g., checking accounts, savings accounts, or the like), an authenticated user can also authorize the mobile device 102 to perform related banking transactions (e.g., transfer funds, pay bills, view statements, and so on) or change user account settings (e.g., changing usernames and passwords, email preferences, and so on).

Figure 2:
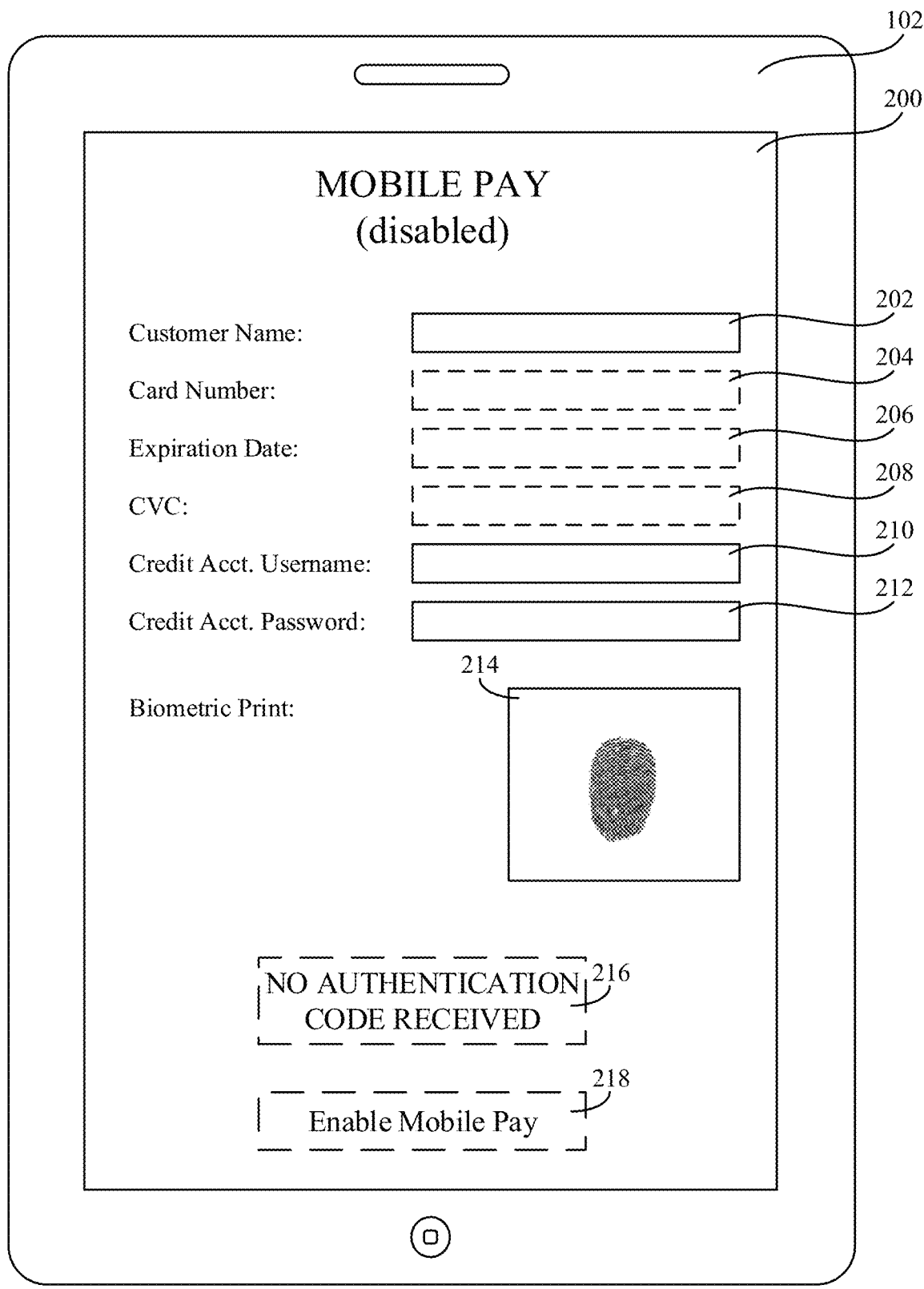
FIG. 2 is a depiction of an example graphical user interface generated by the mobile pay circuit of the mobile device of FIG. 1 that may be used to facilitate receiving and sending authentication and payment data, according to an example embodiment.

Referring now to FIG. 2, an example graphical user interface 200 generated by a mobile pay circuit (e.g., mobile pay circuit 110) on a mobile device 102 is shown according to one example embodiment. The graphical user interface 200 shown includes a plurality of instructions and fields directed to allow a user to enable a mobile pay feature on the mobile device 102. For example, the interface 200 includes instructions and fields for information that can be entered manually (e.g., via a keyboard, a touchscreen, voice commands, and so on), such as a customer name 202, a charge account username 210, a charge account password 212, and a fingerprint 214. Interface 200 also includes several instructions and fields whose manual entry may be optional (e.g., a card number 204, an expiration date 206, and a card verification code 208). These fields may be automatically populated or manually entered and subsequently confirmed upon receiving a contactless transmission from the user's smart card (e.g., the authentication code 114 from the contactless chip 115 on the smart card 104). As shown by a notification 216 at the bottom of the interface 200, a contactless transmission has not yet been received by the mobile device 102, and as such, all of the payment card fields are blank. In addition, as implicitly shown by a dashed enabling trigger 218, the mobile pay function cannot be enabled in the current state of the mobile device 102 without a contactless transmission from a smart card.

Figure 3:
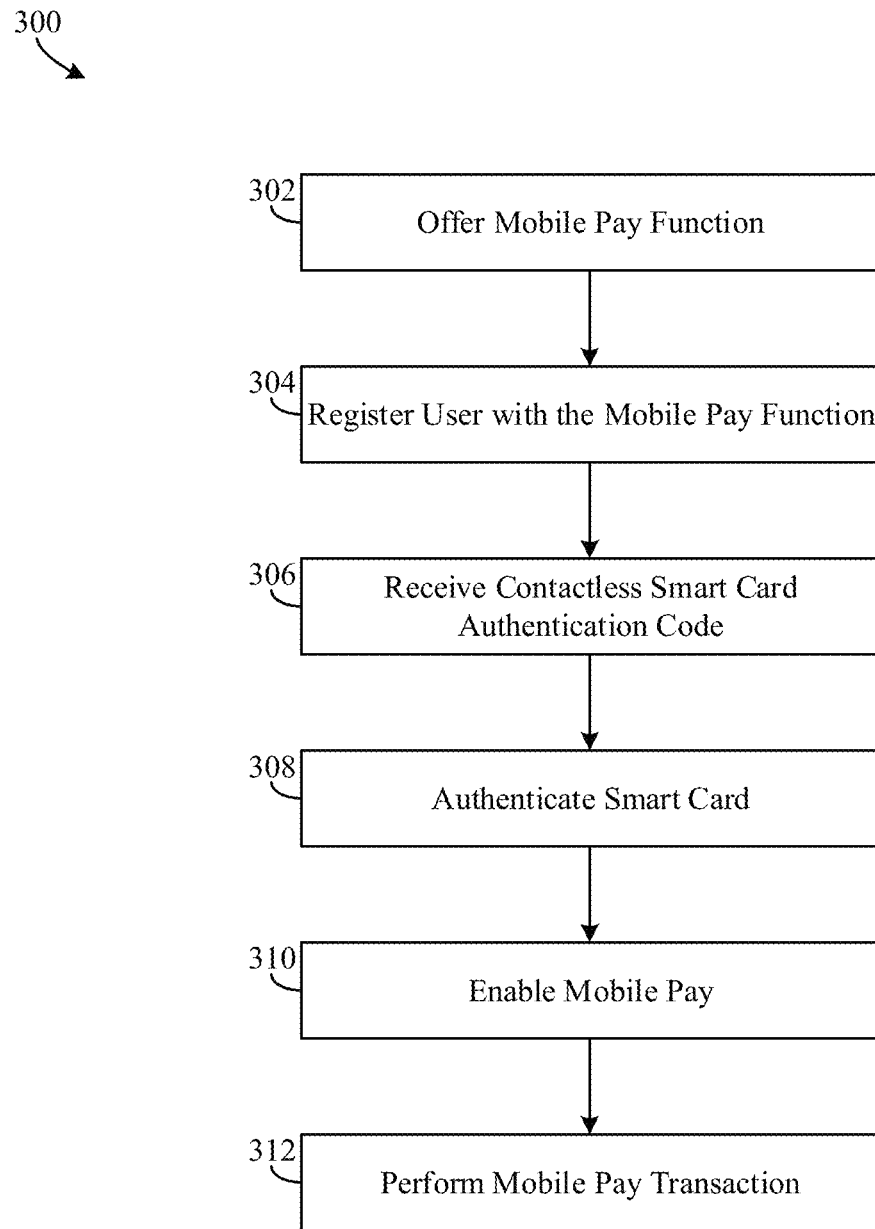
FIG. 3 is a flowchart of a method of enabling, authenticating, and using a mobile pay function to purchase goods or services, according to an example embodiment.

Referring now to FIG. 3, a flowchart of a method 300 of enabling, authenticating, and using a mobile pay feature on a mobile device to purchase goods or services is shown. The method 300 is performed by processing and storage hardware on a user mobile device (e.g., mobile device 102), as executed by one or more logics comprising one or more software applications configured to perform the functions described below.

At 302, a mobile pay function is offered to a user. Mobile pay is a function on the mobile device that allows a user to use a contactless transmission-enabled mobile device to perform financial transactions at a point of sale system (e.g., the point of sale system 122) based on a charge account in the physical absence of the corresponding payment card. In one arrangement, a mobile pay function is offered on a mobile device after a software application obtained from an app store or a developer portal assembles a mobile pay circuit (e.g., mobile pay circuit 110) in the mobile device. In other arrangements, the mobile pay circuit is preconfigured in the mobile device prior to a user purchasing the mobile device, precluding the need for the user to download and install a software application to create the mobile pay circuit. The mobile pay circuit can be configured to cause the mobile device to offer mobile pay by providing one or more notifications or user interfaces to a user, informing the user that the mobile device is capable of a mobile pay function. The notifications can take the form of, for example, a pop-up notification, a page in a tutorial, or a toggle or interface within a mobile device settings or options interface.

At 304, the user registers with the mobile pay function of the mobile device. The user provides affirmative user input to the mobile device indicating that the user wishes to register for mobile pay. The affirmative user input includes one or more physical user inputs (e.g., keystrokes, touchscreen presses, voice commands, and so on) received at a mobile device indicating that the user desires to enable the mobile pay functionality in the mobile device. The affirmative user input can be in response to the notifications provided at 302 (e.g., pressing a toggle, button, or link appearing on the display, or selecting a displayed option in a settings menu, or the like). During the registration, the user provides identifying user information (e.g., user name, address, phone number, or the like) and payment card information (e.g., account number, expiration date, CCV, etc.) to the mobile device. The information may be provided through manual user input by the user (e.g., via the touchscreen or keyboard) and/or by taking a picture of the payment card through a camera of the mobile device. In situations in which the payment card information is provided through the camera of the mobile device, the mobile device can perform optical character recognition to identify the payment card information.

At 306, an authentication code (e.g., authentication code 114) is received as a contactless transmission from a smart card. The authentication code is received by a mobile pay circuit via a contactless logic (e.g., contactless logic 112) at the mobile device. The authentication code can include at least one cryptogram along with other types of information (e.g., identifying user information, payment card information, and so on) as discussed with respect to FIG. 1, above. The authentication code is received after a smart card is brought within a threshold proximity to the mobile device such that a contactless transmission is possible (e.g., within a few inches or even touching the smart card to the mobile device). When the user brings the smart card within sufficient proximity to the mobile device, a wireless data link is established between the smart card and the mobile device, and the smart card can pass a data payload having the authentication code to the mobile device (e.g., via RFID, NFC, or the like).

At 308, a smart card is authenticated. The smart card is authenticated based on the received payment card information (received at 304) and the authentication code (received at 306). The received information and authentication code are used to determine whether the mobile device associated with the user and/or the user himself is authorized to perform transactions with the smart card. In one arrangement, the smart card is authenticated by decrypting an authentication code to reveal a user name, a payment card account number, and a cryptogram. The decrypted information can then be used, for example, to compare corresponding information manually entered into the mobile device by the user (e.g., the user name), or by transmitting an authentication request (i.e., including the cryptogram) to a corresponding card issuer computing system (e.g., card issuer computing system 108). Decrypted authentication code information (e.g., a user name and billing address) can also be compared with account information stored in the mobile device itself (e.g., email accounts, cellular network accounts, and so on). In arrangements where the mobile device passes the received information on to the card issuer computing system, the mobile device may receive an authentication decision from the card issuer (e.g., an authorized or not authorized decision message).

At 310, a mobile pay function is enabled. Enabling the mobile pay function upon successfully authenticating the smart card allows a corresponding mobile device to complete mobile pay transactions. The mobile device can serve as a proxy for the physical payment card such that the user does not need to present the payment card at a point of sale system (e.g., the point of sale system 122).

At 312, a mobile pay transaction is performed. As noted above, the mobile device can be used in place of the payment card. As such, placing the mobile device within a threshold proximity of a contactless transmission-enabled point of sale will allow the point of sale to pull payment information from the mobile device or the mobile device to push payment information to the point of sale sufficient to complete a transaction involving a debit incurred on a user's charge account. Further, in some arrangements, a successful smart card authentication will enable several financial operations on the mobile device, such as accessing charge account information (e.g., balances, available credit, due dates, and so on) and performing charge account actions (e.g., transferring balances, paying bills, changing a username or password, and so on), without requiring the user to provide login information.

Figure 4:
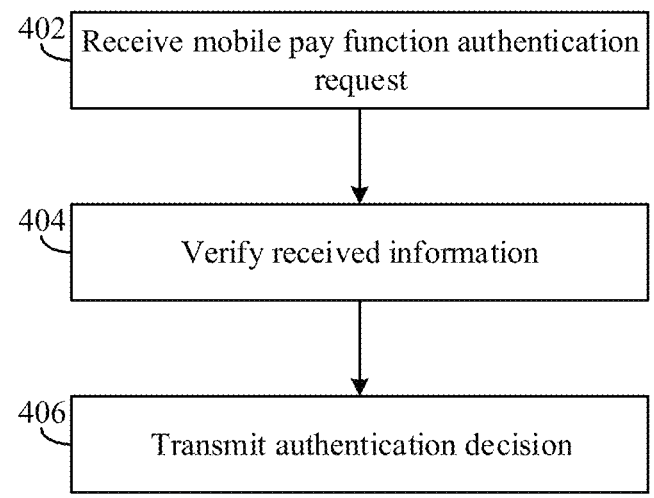
FIG. 4 is a flowchart of a method of authenticating a mobile device for a mobile pay function, according to an example embodiment.

Referring to FIG. 4, a flowchart of a method 400 of authenticating a mobile device for a mobile pay function is shown according to an example embodiment. The method 400 is performed by processing and storage hardware of a card issuer computing system (e.g., the card issuer computing system 108), as executed by one or more logics comprising one or more software applications configured to perform the functions described below.

The method 400 begins when an authentication request for a mobile pay function is received at 402. The card issuer computing system receives the authentication request from a mobile device (e.g., the mobile device 102) attempting to activate a mobile pay feature (e.g., a mobile pay application installed on the mobile device). The authentication request includes user information and payment information. The user information includes a user name, address, phone number, and so on. In some arrangements, the user information includes a unique identifier associated with the mobile device (e.g., a mobile device MAC address). The payment information includes account information associated with a payment card (e.g., the smart card 104). The account information, for example, may include an account number (e.g., a credit card primary account number), an account expiration date, a CCV number, an account holder name, and the like. The payment information also includes an authentication code. The authentication code was generated by the smart card and transmitted to the mobile device (e.g., during an RFID or NFC communication session between the smart card and the mobile device as described above with respect to FIG. 1). The authentication code can include payment card information and identifying customer information, along with a cryptogram, which in some arrangements, is a sequence of characters that have been encoded through one or more algorithms to conceal data from unauthorized parties. The authentication code serves as an indicator that the payment card was present at the mobile device thereby indicating that the user did not simply key in the payment information based on an image of the card or knowledge of the account information.

The information received with the authentication request is verified at 404. The card issuer computing system compares the received user information with known user information associated with the account number of the payment card. For example, the card issue computing system verifies the provided name and address of the user with the known name and address of the account holder associated with the payment card. Additionally, the issuer computing system decodes the authentication code to verify that the authentication code was generated by the payment card (i.e., that the authentication code was not fraudulently created). In some arrangements, the card issuer computing system also compares the mobile device unique identifier with a known mobile device unique identifier associated with the account holder of the payment card (e.g., based on other payment cards registered with the mobile device, etc.).

An authentication decision is transmitted at 406. If any of the information provided does not match known information or cannot be otherwise verified at 404, the request to activate the mobile pay function is denied. In such situations, the card issuer computing system transmits a denial message to the mobile device, which prevents the mobile pay function from functioning on the mobile device with the provided payment card. If all of the information provided matches known information and can be otherwise verified at 404, the request to activate the mobile pay function is approved. In such situations, the card issuer computing system transmits an approval message to the mobile device, which thereby activates the mobile pay function on the mobile device for the provided payment card. When the mobile pay function is activated, the user can use the mobile device as a proxy for the payment card as described above with respect to FIGS. 1 and 3.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of authenticating a payment card for a mobile pay function of a mobile device, the method comprising:
offering, by a mobile pay circuit of the mobile device, the mobile pay function;
establishing, by the mobile pay circuit via a near-field communication (NFC) data connection, a wireless data handshake between the mobile device and the payment card;
in response to a notification provided on the mobile device, receiving, by the mobile pay circuit via the NFC data connection between the mobile device and the payment card, account information of a first financial account including an account number of the payment card, wherein the first financial account is one of a plurality of financial accounts of a customer;
wirelessly receiving, by a contactless logic of the mobile device via the NFC data connection between the mobile device and the payment card, an authentication code from a contactless chip of the payment card, wherein the authentication code includes a cryptogram and non-cryptogram information, the non-cryptogram information including identifying customer information;
presenting, by the mobile pay circuit, a graphical user interface on a display of the mobile device, the graphical user interface including one or more fields;
in response to routing the authentication code that includes the cryptogram and the non-cryptogram information to the mobile pay circuit, automatically populating, by the mobile pay circuit, the one or more fields of the graphical user interface with the received identifying customer information included in the non-cryptogram information;
transmitting, by the mobile pay circuit, a transaction request for a payment transaction to a card issuer computing system associated with a card issuer of the payment card, the transaction request including the identifying customer information, the account information, the authentication code, and a predefined payment amount, the predefined payment amount configured to indicate that the payment transaction is an authentication request;
receiving, by the mobile pay circuit at a first time, an authentication decision from the card issuer computing system based on the authentication request, the authentication decision including proxy payment card information;
in response to an approved authentication decision, enabling, by the mobile pay circuit, (1) the payment card for use with the mobile pay function of the mobile device to conduct a transaction via the proxy payment card information and (2) an additional financial operation on the mobile device without requiring additional authentication information, the additional financial operation involving at least one of the plurality of financial accounts of the customer; and
performing, at a second time and based on the approved authentication decision received at the first time, the additional financial operation on the mobile device without requiring additional authentication information from the customer.

2. The method of claim 1, wherein the predefined payment amount is $0.00 or $0.01.

3. The method of claim 1, wherein the payment card is one of a credit card or a debit card.

4. The method of claim 1, wherein the graphical user interface includes an enabling trigger, the method further comprising:
in response to enabling the payment card for use with the mobile pay function of the mobile device, permitting selection of the enabling trigger.

5. The method of claim 1, wherein the additional financial operation is an operation to provide access to the user to financial information associated with the payment card, the financial information associated with the payment card including at least one of an account balance, an amount of available credit, or a payment due date.

6. The method of claim 1, wherein the additional financial operation is an operation to provide access to the user to a web page including financial information associated with the payment card, the financial information associated with the payment card including at least one of an account balance, an amount of available credit, or a payment due date.

7. The method of claim 1, wherein the additional financial operation is a second transaction involving a second financial account of the plurality of financial accounts, wherein the second financial account is a non-credit account.

8. A mobile device comprising:
a network interface configured to communicate information over a network with a computing system;
a contactless logic configured to wirelessly communicate with a contactless chip of a payment card;
a processor coupled to non-transitory machine readable storage media having instructions stored therein that, when executed, cause the processor to:
establish, by the contactless logic via a near-field communication (NFC) data connection, a wireless data handshake between the mobile device and the payment card;
in response to a notification provided on the mobile device, receive via the NFC data connection between the mobile device and the payment card, account information of a first financial account including an account number of the payment card, wherein the first financial account is one of a plurality of financial accounts of a customer;
wirelessly receive, by the contactless logic via the NFC data connection between the mobile device and the payment card, an authentication code including a cryptogram from the contactless chip of the payment card, wherein the authentication code includes a cryptogram and non-cryptogram information, the non-cryptogram information including identifying customer information;
present a graphical user interface on a display, the graphical user interface including one or more fields;
in response to routing the authentication code that includes the cryptogram and the non-cryptogram information to the contactless logic, automatically populate the one or more fields of the graphical user interface with the received identifying customer information included in the non-cryptogram information;
transmit a transaction request for a payment transaction to the computing system associated with an issuer of the payment card, the transaction request including the identifying customer information, the account information, the authentication code, and a predefined payment amount, the predefined payment amount configured to indicate to the computing system that the payment transaction is an authentication request;

receive, at a first time, an approval authentication decision from the computing system based on the authentication request, the authentication decision including proxy payment card information;

enable, in response to the received approval authentication decision, (1) the payment card for use with a mobile pay function of the mobile device to conduct a transaction via the proxy payment card information and (2) an additional financial operation on the mobile device without requiring additional authentication information, the additional financial operation involving at least one of the plurality of financial accounts of the customer; and perform, at a second time and based on the approval authentication decision received at the first time, the additional financial operation on the mobile device without requiring additional authentication information from the customer.

9. The mobile device of claim 8, wherein the payment card is at least one of a debit card or a credit card.

10. The mobile device of claim 8, wherein the additional financial operation is an operation to provide access to the user to financial information associated with the payment card, the financial information associated with the payment card including at least one of an account balance, an amount of available credit, or a payment due date.

11. The mobile device of claim 8, wherein the additional financial operation is an operation to provide access to the user to a web page including financial information associated with the payment card, the financial information associated with the payment card including at least one of an account balance, an amount of available credit, or a payment due date.

12. The mobile device of claim 8, wherein the additional financial operation is a second transaction involving a second financial account of the plurality of financial accounts, wherein the second financial account is a non-credit account.

\* \* \* \* \*